(12) United States Patent
Ebisawa

(10) Patent No.: US 8,067,999 B2
(45) Date of Patent: Nov. 29, 2011

(54) ELECTRICAL WAVEFORM ADJUSTER

(75) Inventor: Katsuo Ebisawa, Aomori (JP)

(73) Assignee: eWintec Co., Ltd., Kamikita-gun, Aomori (JP)

(*) Notice: Subject to any disclaimer, the term of this patent is extended or adjusted under 35 U.S.C. 154(b) by 723 days.

(21) Appl. No.: 11/579,461

(22) PCT Filed: May 6, 2005

(86) PCT No.: PCT/JP2005/008365
§ 371 (c)(1),
(2), (4) Date: Aug. 28, 2008

(87) PCT Pub. No.: WO2005/109596
PCT Pub. Date: Nov. 17, 2005

(65) Prior Publication Data
US 2009/0206949 A1    Aug. 20, 2009

(30) Foreign Application Priority Data
May 7, 2004  (JP) ................... 2004-139249

(51) Int. Cl.
*H03H 7/00* (2006.01)
(52) U.S. Cl. .......................... 333/181; 333/185
(58) Field of Classification Search .............. 333/168, 333/172, 178, 181, 185, 182
See application file for complete search history.

(56) References Cited

U.S. PATENT DOCUMENTS

| | | | | |
|---|---|---|---|---|
| 2,491,681 A | * | 12/1949 | Minter | 333/168 |
| 2,890,420 A | * | 6/1959 | Bradburd | 333/20 |
| 3,456,215 A | * | 7/1969 | Denes | 333/182 |
| 3,652,958 A | * | 3/1972 | Zelina | 333/181 |
| 5,548,165 A | * | 8/1996 | Mohan et al. | 307/36 |
| 6,861,929 B2 | * | 3/2005 | Tsunoda et al. | 333/206 |

FOREIGN PATENT DOCUMENTS

| | | |
|---|---|---|
| JP | 54-017429 B2 | 6/1979 |
| JP | 55-091215 U | 6/1980 |
| JP | 60-165841 A | 8/1985 |
| JP | 61-023863 Y2 | 7/1986 |
| JP | 2-268506 A | 11/1990 |
| JP | 2000-236627 A | 8/2000 |
| JP | 2000-348944 A | 12/2000 |
| JP | 2002-373812 A | 12/2002 |

* cited by examiner

*Primary Examiner* — Robert Pascal
*Assistant Examiner* — Kimberly Glenn
(74) *Attorney, Agent, or Firm* — Chapman and Cutler LLP

(57) ABSTRACT

An electrical waveform adjuster capable of adjusting various voltage waveforms supplied to an electric apparatus to improve an operation capability of the electric apparatus, and to provide an electrical waveform adjuster capable of mitigating physical harmful effects on a user of the apparatus. The waveform adjuster can be provided either in a connection line between a power feeding line for feeding an alternating-current voltage to an electric apparatus and a power factor adjusting capacitor connected in parallel with the power feeding line, or in a connection line connected in parallel or in series with a power feeding line for feeding an alternating-current voltage to an electric apparatus. The waveform adjuster includes at least one mass comprised of a conductive material attached to the connection line, a ceramic outer frame formed to enclose the mass; and a non-conductive filling material provided between the outer frame and the mass.

14 Claims, 10 Drawing Sheets

Fig. 1
(a)
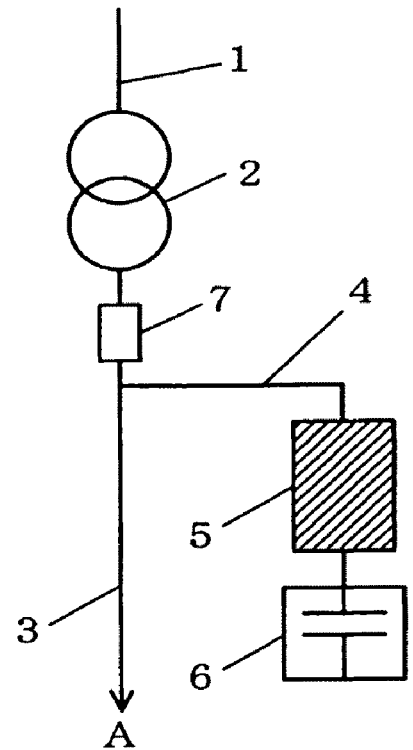
(b)
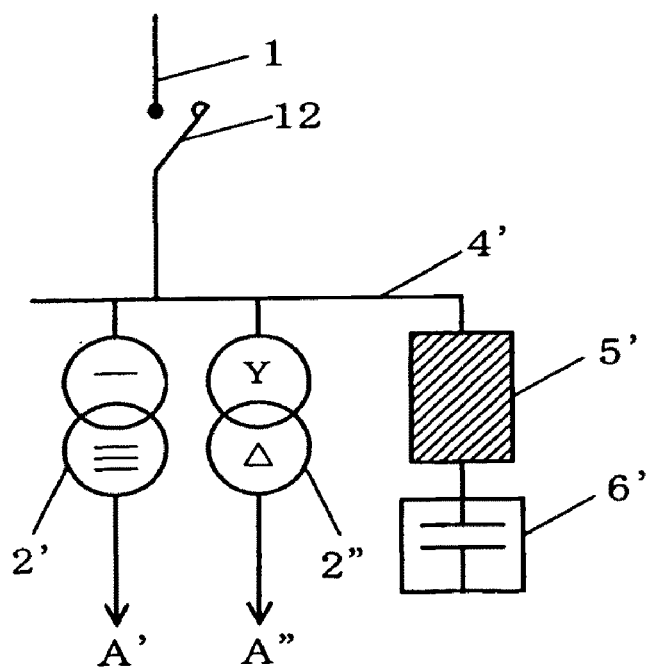

Fig. 6
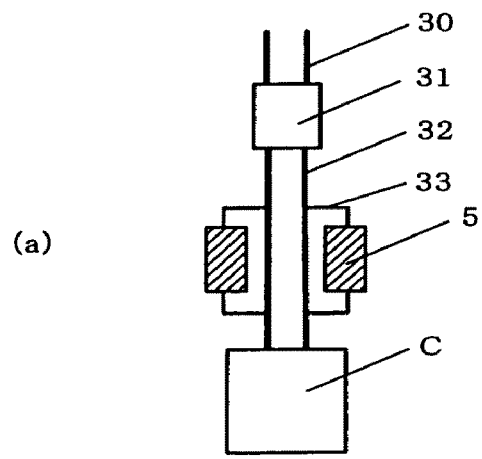
(a)
(b)
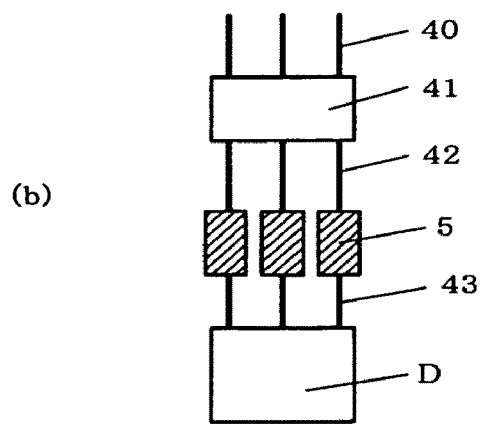
Fig. 7
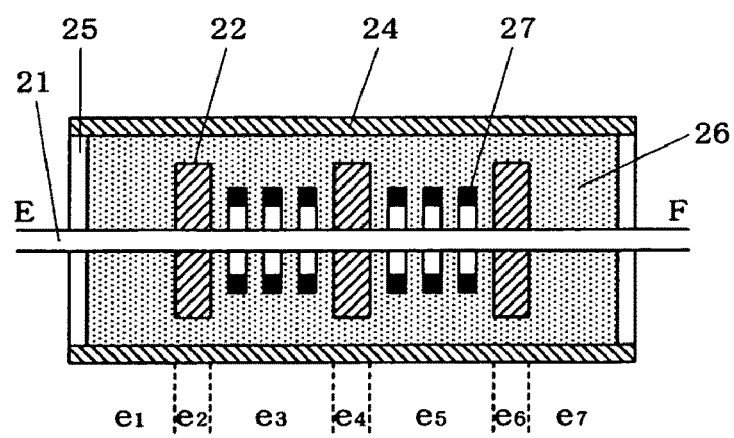

Fig. 8
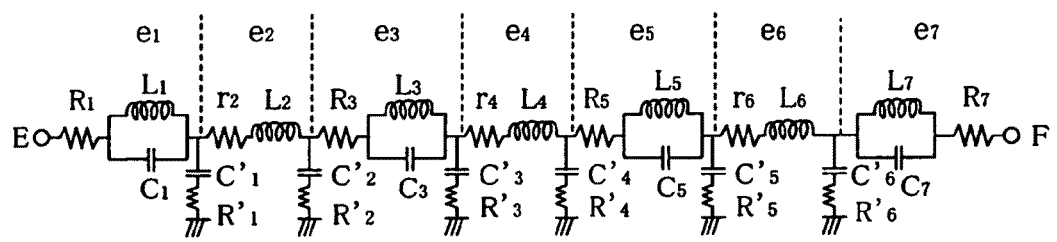
Fig. 9
(a)                  (b)
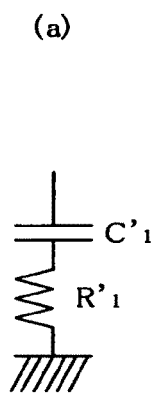
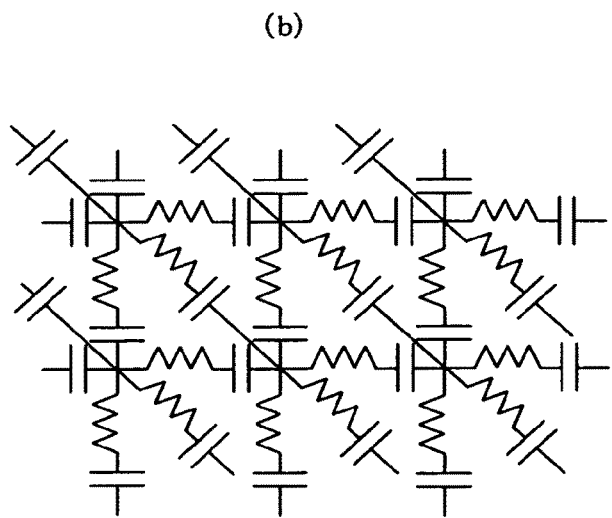

Fig. 15
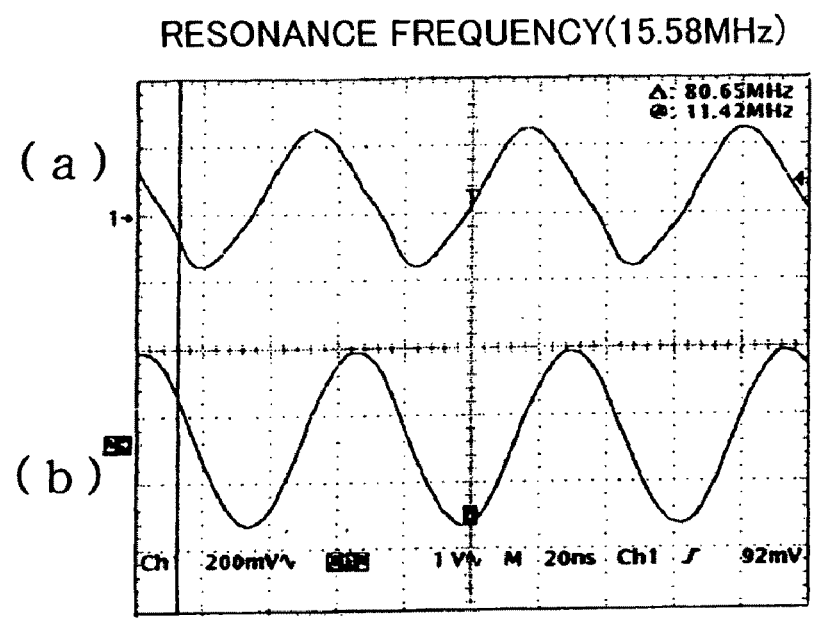
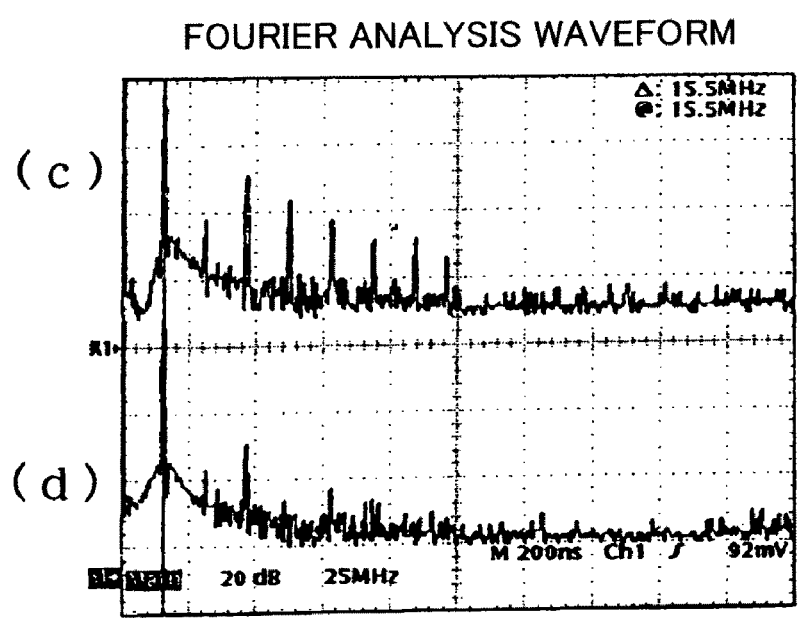

ELECTRICAL WAVEFORM ADJUSTER

TECHNICAL FIELD

The present invention relates to an electrical waveform adjuster disposed in a power feeding line for feeding an alternating-current voltage or a direct-current voltage to an electric apparatus. More particularly, this invention relates to an electrical waveform adjuster for adjusting a voltage waveform supplied to an electric apparatus to improve an operation capability of the electric apparatus and to mitigate physical harmful effects on an user of the electric apparatus.

RELATED ART

In recent years, due to the deregulation of electric utilities, power supply has been performed by using surplus power of private power generation installed in a plant or a building, in addition to the conventional power supply from electric power companies. As power supply sources have been diversified like this, there tends to be generated voltage waveform distortion or noise mixed therein due to different power generation systems or electric transmission facilities of the supply side although certain conditions are imposed on a frequency, a voltage or the like.

In addition, since electric apparatuses for use in a plant, an office, or a household have been diversified, there occur various problems such as a load change due to a connection and a disconnection of electric apparatus, a malfunction of electric apparatus due to noise mixed in supplied power, and noise generated in an exterior of electric apparatus caused by an electric apparatus itself.

Meanwhile, although used electric apparatuses are designed to demonstrate its best operation capability in response to ideal power supply, the operation capability is adjusted to be within a range required for corresponding to various power supplies.

Furthermore, as disclosed in below Patent Documents 1 to 3, a filter for removing noise is provided in a power feeding line or a power section of an electric apparatus in order to mitigate influences of noise flowing into the electric apparatus or flowing out therefrom. Also, a low-voltage phase advance capacitor is provided in a power feeding line to improve a power factor in order to prevent a power loss or a voltage drop of the power feeding line due to a connection of electric apparatus.

Patent Document 1:
Japanese Unexamined Utility Model Application Publication No. S55-91215
Patent Document 2:
Japanese Patent Application Laid-Open No. S60-165841
Patent Document 3:
Japanese Patent Application Laid-Open No. 2002-373812

In addition, many and various electric apparatuses are presently used in our daily life, and our life is surrounded by such electric apparatuses. Under such circumstances, more and more people suffer from physical harmful effects such as eye strain, neck strain and shoulder strain, or headache. Although the causal relationship between the causes of such harmful effects and the electric apparatuses hasn't been revealed, such harmful effects have been reported a lot especially from users who use an electric apparatus such as a personal computer for a long period of time.

DISCLOSURE OF THE INVENTION

Problems to be Solved by the Invention

To solve the problems as described above, an object of the present invention is to provide an electrical waveform adjuster capable of adjusting various voltage waveforms supplied to an electric apparatus to improve an operation capability of the electric apparatus, and also, to provide an electrical waveform adjuster capable of mitigating physical harmful effects on a user of the electric apparatus.

Means for Solving the Problems

In order to solve the problems as described above, according to a first aspect of the invention, there is provided an electrical waveform adjuster including a power factor adjusting capacitor connected in parallel with a power feeding line for feeding an alternating-current voltage to an electric apparatus, wherein at least one or more low-resistance line sections having lower line resistivity than that of a connection line for electrically connecting the power feeding line and the power factor adjusting capacitor are provided in the connection line.

According to a second aspect of the invention, there is provided an electrical waveform adjuster connected in parallel or in series with a power feeding line for feeding an alternating-current voltage to an electric apparatus, wherein at least one or more low-resistance line sections having lower line resistivity than that of a connection line electrically connected in parallel or in series with the power feeding line are provided in the connection line.

According to a third aspect of the invention, there is provided the electrical waveform adjuster according to the first or second aspect, wherein the low-resistance line section has inductance components.

According to a fourth aspect of the invention, there is provided the electrical waveform adjuster according to any one of the first to third aspects, wherein a mass made of a conductive material is attached to the connection line to configure the low-resistance line section.

According to a fifth aspect of the invention, there is provided the electrical waveform adjuster according to the fourth aspect, wherein the mass is column-shaped, and the connection line penetrates along the central axis of the column-shaped mass.

According to a sixth aspect of the invention, there is provided the electrical waveform adjuster according to the fourth or fifth aspect, wherein a metal including at least one of gold, silver, and copper is used for the conductive material.

According to a seventh aspect of the invention, there is provided the electrical waveform adjuster according to any one of the fourth to sixth aspects, wherein the mass is one of a plurality of masses which are disposed along the connection line, and a ceramic ring-shaped member is disposed between the masses.

According to an eighth aspect of the invention, there is provided the electrical waveform adjuster according to any one of the fourth to seventh aspects, wherein a ceramic outer frame is formed to enclose the masses, and a non-conductive filling material is provided between the outer frame and the masses.

According to a ninth aspect of the invention, there is provided the electrical waveform adjuster according to the eighth aspect, wherein the filling material is made of a material including at least one of ceramic particles, silica rock and epoxy resin.

According to a tenth aspect of the invention, there is provided the electrical waveform adjuster according to any one of the sixth to ninth aspects, wherein a material including germanium is used for at least one of the conductive material, the ring-shaped member, the outer frame, and the filling material.

Effects of the Invention

In the first aspect of the invention, since the power factor adjusting capacitor connected in parallel with the power feeding line is provided, it is possible to prevent a power loss or a voltage drop of the power feeding line due to a connection of the electric apparatus. By providing at least one or more low-resistance line sections having lower line resistivity than that of the connection line in the connection line which electrically connects the power feeding line and the power factor adjusting capacitor, it is possible to adjust a voltage waveform inputted into the electric apparatus to a more appropriate waveform for the operation capability of the electric apparatus. Furthermore, since a resistance value along the connection line is changed between the line resistivity of the connection line itself and the line resistivity lower than that of the connection line, it is possible to minimize a power loss due to the change in the resistance value.

In addition, by using the electrical waveform adjuster having the configuration as described above for various electric apparatuses, it is possible to mitigate physical harmful effects on a user of the electric apparatus.

In the second aspect of the invention, in the electrical waveform adjuster connected in parallel or in series with the power feeding line for feeding an alternating-current voltage to an electric apparatus, at least one or more low-resistance line sections having lower line resistivity than that of the connection line electrically connected in parallel or in series with the power feeding line are provided in the connection line. Therefore, even when the power factor adjusting capacitor is not used, it is possible to adjust a supplied voltage waveform to a more appropriate waveform for the operation capability of the electric apparatus. Furthermore, since a resistance value along the connection line is changed between the line resistivity of the connection line itself and the line resistivity lower than that of the connection line, it is possible to minimize a power loss due to the change in the resistance value.

In addition, by using the electrical waveform adjuster having the configuration as described above for various electric apparatuses, it is possible to mitigate physical harmful effects on a user of the electric apparatus.

In the third aspect of the invention, since the low-resistance line section of the electrical waveform adjuster has the inductance components, it is possible to suppress extra harmonic components in the voltage waveform inputted into the electric apparatus, and more appropriate voltage waveform can be formed.

In the fourth aspect of the invention, since the mass made of the conductive material is attached to the connection line to configure the low-resistance line section, it is possible to form the low-resistance line section in a simple configuration, to simplify the production process and lower the manufacturing cost.

In the fifth aspect of the invention, since the mass provided in the low-resistance line section is column-shaped and the connection line penetrates along the central axis of the column-shaped mass, it is possible to form the low-resistance line section very easily. In addition, since the column-shaped mass surrounds the connection line with the connection line as the central axis, the low-resistance line section is symmetrical with respect to the connection line. Therefore, it is possible to prevent the low-resistance line section from causing noise or the like to be generated, and to form an electrically-stable electric component. Furthermore, since the mass is column-shaped, the mass itself functions as a coil, and when a plurality of masses are disposed, a capacitor is formed between the masses, and it is possible to adjust the voltage waveform inputted into the electric apparatus to a more appropriate waveform.

In the sixth aspect of the invention, since the metal including at least one of gold, silver, and copper is used for the conductive material of the mass constituting the low-resistance line section, it is possible to easily form the low-resistance line section having lower line resistivity than that of the connection line. By using the relatively stable metal such as gold, silver, and copper, it is also possible to prevent properties of the metal from being changed by transformation such as oxidation.

In the seventh aspect of the invention, since the plurality of the masses are disposed along the connection line and the ceramic ring-shaped member is disposed between the masses, the ceramic ring-shaped member functions as a spacer which properly maintains the disposition of the masses, and also, the ceramic ring-shaped member has the function of adjusting a dielectric constant of a space between the masses to adjust a capacity of the capacitor formed between the masses. Therefore, it is possible to appropriately adjust the voltage waveform inputted into the electric apparatus.

In the eighth aspect of the invention, by forming the ceramic outer frame to enclose the masses and providing the non-conductive filling material between the outer frame and the masses, it is possible to prevent the low-resistance line sections including the masses from being exposed, to thereby improve electric safety performance, and also, to prevent the low-resistance line sections from being exposed to outside air and transforming.

In addition, a capacitor is formed between the outer frame and the masses, and the dielectric constant due to the filling material is adjusted. An infinite three-dimensional coupled circuit of the capacitor and resistance is thereby formed between the outer frame and the masses. Therefore, it is possible to effectively remove harmonic components, and appropriately adjust the voltage waveform inputted into the electric apparatus.

In the ninth aspect of the invention, since the filling material is made of the material including at least one of ceramic particles, silica rock and epoxy resin, the masses of the low-resistance line sections are surrounded by the material having high insulation properties and heat resistance. Therefore, it is possible to avoid a risk of electric leakage and to prevent degradation of the properties due to thermal alteration.

In addition, by using the material having dielectric properties such as silica particles or silica powder, an infinite three-dimensional coupled circuit of the capacitor and resistance is formed between the outer frame and the masses, and it is possible to effectively remove harmonic components, and appropriately adjust the voltage waveform inputted into the electric apparatus.

In the tenth aspect of the invention, since the material including germanium is used for at least one of the conductive material, the ring-shaped member, the outer frame, and the filling material, characteristics of the electrical waveform adjuster can be adjusted and balanced characteristics can be provided.

BRIEF DESCRIPTION OF THE DRAWINGS

FIG. 1 is a view illustrating one example of an electric circuit to which an electrical waveform adjuster according to the present invention is applied;

FIG. 6 is a view illustrating a case where only the adjusting circuit is used without using a phase advance capacitor;

FIG. 7 is a cross-sectional view illustrating another adjusting circuit of the electrical waveform adjuster;

FIG. 8 is a view illustrating an equivalent circuit of the adjusting circuit of FIG. 7;

FIG. 9 is a view illustrating an infinite three-dimensional coupled circuit of a capacitor and resistance by a filling material;

FIG. 15 is a graph showing the measurement result of FIG. 14.

REFERENCE NUMERAL

Figure 2:
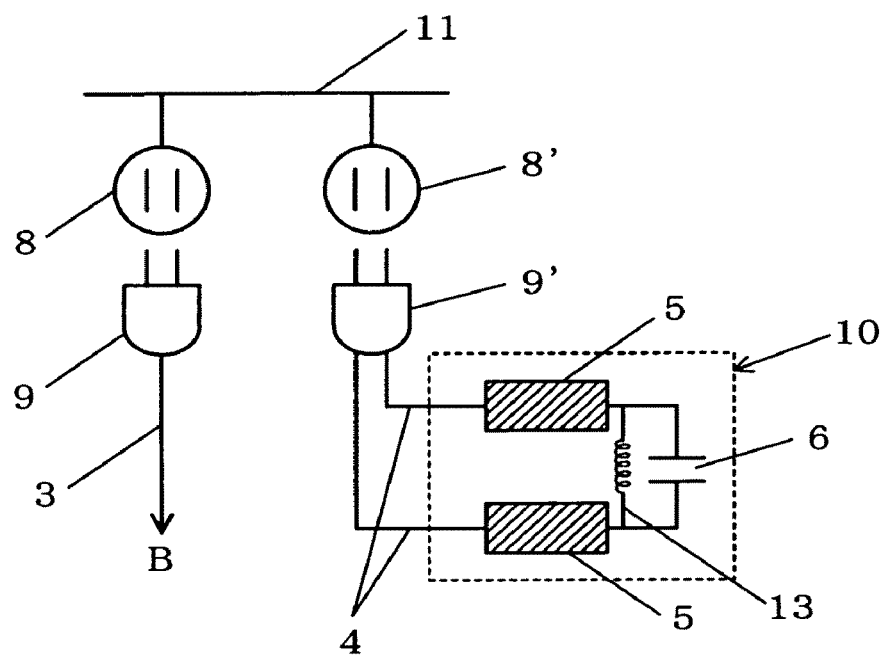
FIG. 2 is a view illustrating a case where an electrical outlet frequently used in general household is used.

| | |
|---|---|
| 1: | Primary power feeding line |
| 2, 2', 2": | Transformer |
| 3: | Secondary power feeding line |
| 4, 4': | Connection line |
| 5, 5': | Adjusting circuit |
| 6, 6': | Phase advance capacitor |
| 7, 31: | Circuit breaker |
| 8, 8': | Outlet |
| 9, 9': | Plug |
| 10: | Electrical waveform adjuster |
| 11, 30, 32, 40, 42, 43: | Power feeding line |
| 12: | Switch |
| 13: | Discharge coil |
| 21: | Connection line |
| 22: | Column-shaped body |
| 23: | Through hole |
| 24: | Outer frame |
| 25: | Sealing means |
| 26: | Filling material |
| 27: | Ceramic ring-shaped member |
| 33: | Branch line |
| A, A', A", B, C, D: | Electric apparatus |

BEST MODES FOR CARRYING OUT THE INVENTION

The present invention is described in detail with preferred embodiments below.

The main characteristic of the present invention is that, in an electrical waveform adjuster including a power factor adjusting capacitor connected in parallel with a power feeding line for feeding an alternating-current voltage to an electric apparatus, at least one or more low-resistance line sections having lower line resistivity than that of a connection line for electrically connecting the power feeding line and the power factor adjusting capacitor are provided in the connection line. Also, in an electrical waveform adjuster connected in parallel or in series with a power feeding line for feeding an alternating-current voltage to an electric apparatus, at least one or more low-resistance line sections having lower line resistivity than that of a connection line electrically connected in parallel or in series with the power feeding line are provided in the connection line.

FIG. 1A is a view illustrating one example of an electric circuit to which the electrical waveform adjuster of the present invention is applied.

Reference numeral 1 denotes a primary power feeding line, 2 denotes a transformer, and 3 denotes a secondary power feeding line. Various electric apparatus A such as an electric motor, an electric heater, and a lighting apparatus, is connected to the end of the secondary power feeding line. In addition, reference numeral 7 denotes a circuit breaker.

Reference numeral 6 denotes a low-voltage phase advance capacitor connected in parallel with the secondary power feeding line 3 for improving a power factor of the power feeding line and preventing a power loss or a voltage drop of the power feeding line due to a connection of the electric apparatus.

The attachment capacity of the low-voltage phase advance capacitor is preliminarily defined by JEAC 8001, the supplying clause of each electric power company, or the like.

Reference numeral 5 denotes an adjusting circuit including the low-resistance line section, which is the characteristic of the electrical waveform adjuster of the present invention. The adjusting circuit 5 is provided in a connection line 4 which connects the low-voltage phase advance capacitor 6 and the secondary power feeding line 3.

Although the phase advance capacitor 6 and the adjusting circuit 5 are provided in the secondary power feeding line 3 in FIG. 1A, the present invention is not limited to the configuration as described above, and a high-voltage phase advance capacitor 6' may be provided in the primary power feeding line 1 and an adjusting circuit 5' may be similarly provided therein as shown in FIG. 1B. In addition, similar configuration as described above may be provided in a three-phase alternating current power feeding line in addition to the single-phase alternating current power feeding line. Reference numeral 12 denotes a switch, 2' denotes a transformer for electric light, 2" denotes a transformer for motive energy, A' denotes an electric apparatus such as an electric light, and A" denotes an electric apparatus such as an electric motor.

FIG. 2 shows a case where an electrical outlet frequently used in general household is used.

Reference numeral 11 denotes a power feeding line, and an electrical outlet 8 is provided for the power feeding line 11. Power is supplied to a household electric apparatus B through a power feeding line 3 by inserting a plug 9 into the electrical outlet 8.

An electrical waveform adjuster 10 of the present invention is connected to another electrical outlet 8' which is connected to the power feeding line 11. If necessary, such methods may be used as a method of connecting a plug 9' to the same electrical outlet 8 to which the electric apparatus B is connected, via a branch unit such as a two-pronged socket, or a method of providing an outlet, into which the plug 9 can be inserted, for the plug 9', instead of using the electrical outlet 8'. By connecting the plug 9' to the electrical outlet 8', the electrical waveform adjuster 10 is connected in parallel with the power feeding lines 11 and 3.

The electrical waveform adjuster 10 has the phase advance capacitor 6, capacity of which is properly set in advance in consideration of the connection of various electric apparatuses such as the electric apparatus B, and the adjusting circuit 5 including the low-resistance line section is provided in the connection line 4 for connecting the capacitor 6 and the power feeding line 11.

Only one adjusting circuit 5 may be provided in the connection line 4, or two of the adjusting circuits 5 may be provided in the connection line 4 as shown in FIG. 2. In addition, it is possible to similarly adjust the number of adjusting circuits 5 in a case of using the three-phase alternating current power feeding line.

A discharge coil 13 may be provided for enabling discharge of stored charge in the capacitor 6 when the electrical waveform adjuster is not used.

Furthermore, the entire electrical waveform adjuster may be downsized by using a film capacitor or the like as the capacitor of the electrical waveform adjuster.

When using an electric apparatus C or D in which a power factor is not delayed such as a heater, the adjusting circuit 5 may be disposed in series with power feeding lines 42 and 43 as shown in FIG. 6B. However, when the thickness of the power feeding line becomes larger, it becomes necessary to attach a bigger conductive mass to the power feeding line as described below. Thus, when an expensive metal such as silver is used, the cost of manufacturing the electrical waveform adjuster becomes extremely high. Therefore, as shown in FIG. 6A, the electrical waveform adjuster may have such configuration that a branch line 33 having smaller diameter than a power feeding line 32 to the electric apparatus C is provided and the adjusting circuit 5 is disposed in the branch line 33. Reference numerals 30 and 40 denote power feeding lines, and 31 and 41 denote circuit breakers.

Next, a configuration of the adjusting circuit 5 including the low-resistance line section is described.

Figure 3:
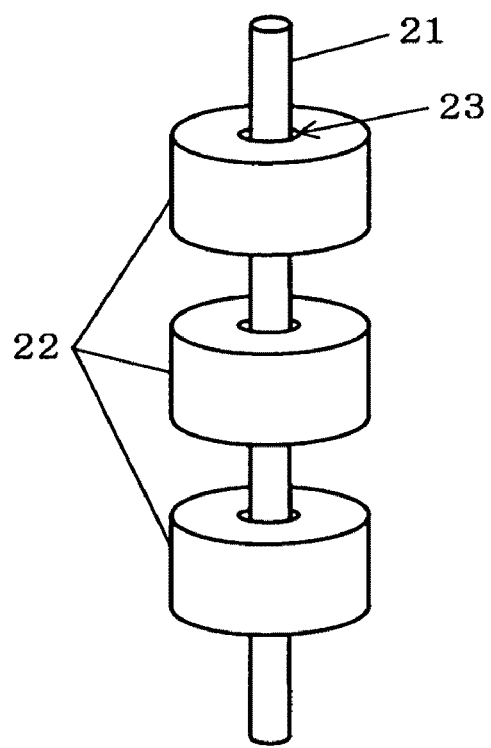
FIG. 3 is a perspective view illustrating a core component constituting an adjusting circuit of the electrical waveform adjuster.

FIG. 3 is a perspective view illustrating a core component of the adjusting circuit 5. Reference numeral 21 denotes a connection line, which is normally made of an alloy including copper, aluminum and zinc. The connection line may include one rod-like line, or a plurality of thin lines twisted together to be one line.

Reference numeral 22 denotes a column-shaped mass (referred to as column-shaped body below) made of a material, such as gold, silver and copper, which has high conductivity and is stable without transforming for a long period of time. A through hole 23, into which the connection line 21 can be inserted, is formed in the center of the column-shaped body 22.

As the material used for the column-shaped body, other metals than gold, silver, and copper, or an alloy may be used as long as the material has high conductivity and is chemically stable. In addition, although the shape of the mass is not limited to column-shaped, when the mass is column-shaped, the connection line is surrounded by the column-shaped mass with the connection line as the central axis. Because of the configuration, the low-resistance line section becomes symmetrical with respect to the connection line, and it is possible to prevent the low-resistance line section from causing noise or the like to be generated, and to form an electrically-stable electric component. Furthermore, since the mass is column-shaped, the mass itself functions as a coil, and when a plurality of masses are disposed, a capacitor is formed between the masses. Therefore, the voltage waveform inputted into the electric apparatus can be adjusted to a more appropriate waveform.

The column-shaped body 22 is fixed to the connection line 21 by using a connecting means having conductivity such as a solder.

It is preferable to provide at least one or more column-shaped bodies 22. When two or more column-shaped bodies 22 are provided, an insulating spacer may be provided between the respective column-shaped bodies 22 along the connection line 21 if necessary. For example, an insulating coating material such as vinyl chloride and fluorine resin which is frequently used as a coating material of a conductive wire may be used as the spacer. By providing a ceramic ring-shaped member, the ceramic ring-shaped member functions as a spacer for properly maintaining the disposition of the respective masses, and also, the ceramic ring-shaped member has the function of adjusting a dielectric constant of a space between the masses to adjust a capacity of the capacitor formed between the masses. Therefore, it is possible to appropriately adjust the voltage waveform inputted into the electric apparatus.

The line resistivity of a position where the column-shaped body 22 is connected to the connection line 21 is lower than the line resistivity of another portion of the connection line. The electrical waveform adjuster of the present invention is characterized in that at least one or more of such low-resistance line sections having lower line resistivity are formed.

Figure 4:
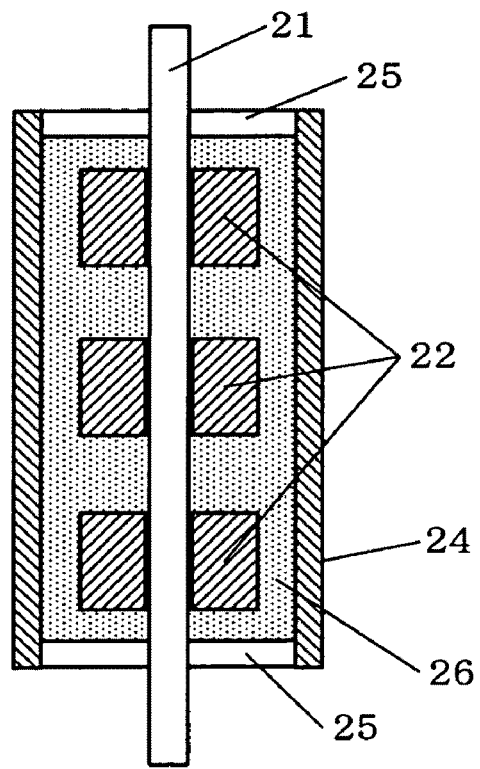
FIG. 4 is a cross-sectional view illustrating the adjusting circuit of the electrical waveform adjuster.

FIG. 4 is a cross-sectional view illustrating the adjusting circuit 5 in which the core component shown in FIG. 3 is incorporated.

The core component, in which the column-shaped bodies 22 are fixed to the connection line 21 with the conductivity being maintained, is accommodated in a ceramic outer frame 24. At the same time, a material having high insulation properties and heat resistance, which is made of a material including at least one of ceramic particles, silica rock (particles or powder) and epoxy resin, is filled thereinto as a filling material 26.

As shown in FIG. 7, a ceramic ring-shaped member 27 may be disposed between the column-shaped bodies 22 and the filling material 26 and the ceramic outer frame 24 as in FIG. 4 may be provided. An equivalent circuit of the electrical waveform adjuster in FIG. 7 may be shown in FIG. 8.

Corresponding to respective regions $e_1$ to $e_7$ between an input end E and an output end F in FIG. 7, the same reference numerals are described for separating the respective regions in FIG. 8.

The characteristic of the adjusting circuit seen from the equivalent circuit in FIG. 8 is that small resistance ($r_2$, $r_4$, $r_6$) and a coil ($L_2$, $L_4$, $L_6$) are connected in series with each other since a voltage waveform passes through and is reflected in the column-shaped body 22 in the region ($e_2$, $e_4$, $e_6$) of the column-shaped body 22, and a parasitic capacity is generated between the column-shaped body 22 and the ceramic outer frame 24, to thereby connect a capacitor ($C'_2$, $C'_4$, $C'_6$) and resistance ($R'_2$, $R'_4$, $R'_6$).

In addition, in a region ($e_1$, $e_3$, $e_5$, $e_7$) other than the column-shaped body 22, resistance ($R_1$, $R_3$, $R_5$, $R_7$) by the connection line 21, a coil component ($L_1$, $L_3$, $L_5$, $L_7$), and a capacitor ($C_1$, $C_3$, $C_5$, $C_7$) formed between the column-shaped bodies 22 or between the column-shaped body 22 and an external terminal, are connected, and a capacitor ($C'_1$, $C'_3$, $C'_5$, $C'_7$) by the parasitic capacity between the connection line 21 and the ceramic outer frame 24, and resistance ($R'_1$, $R'_3$, $R'_5$, $R'_7$) are connected.

In the capacitor ($C'_1$ to $C'_7$) and the resistance ($R'_1$ to $R'_7$), by using a dielectric material such as silica rock (particles or powder) for the filling material 26, due to the filling material itself or the capacitor component generated in the filling material, the capacitor and the resistance shown in FIG. 8 (one example is shown in FIG. 9A) are considered to form an infinite three-dimensional coupled circuit of the capacitor and the resistance between the outer frame and the mass as shown in FIG. 9B, and play an important role in effectively removing harmonic components.

In addition, since the column-shaped body is the mass, an inductance ($L_2$, $L_4$, $L_6$), which is a coil component held by the column-shaped body 22, does not always show a constant value, but changes depending on a frequency.

The function of adjusting an electrical waveform by the adjusting circuit 5 as described above can be adjusted by adjusting the size, material, and number of the column-shaped bodies 22, by adjusting the size or the number of the ceramic ring-shaped members, by adjusting the material or amount of the filling material, by adjusting the size of the ceramic outer frame, or the like. By using a material with germanium added therein for at least one of the column-shaped conductive material, the ring-shaped member, the outer frame, and the filling material, it is possible to adjust characteristics of the electrical waveform adjuster. By adding germanium as above, it is possible to provide balanced characteristics of the electrical waveform adjuster, for example to prevent the function of adjusting a waveform from varying in response to an output change of an electric apparatus.

As shown in FIG. 4 or FIG. 7, the both ends of the outer frame 24 are sealed by sealing means 25 such as an insulating rubber.

Although the insulating rubber may coat the entire core component instead of the ceramic outer frame 24, it is preferable to use a material with superior withstand voltage characteristics such as ceramic, especially when the electrical waveform adjuster of the present invention is disposed in a high-voltage power feeding line.

Since the conductive mass constituting the low-resistance line section and the connection line are surrounded by the filling material 26 having high insulation properties and heat resistance as described above, it is possible to avoid a risk of electric leakage and to prevent degradation of the properties due to thermal alteration.

In addition, although the adjusting circuit 5 used for the electrical waveform adjuster of the present invention may be configured using the connection line to the low-voltage phase advance capacitor, the adjusting circuit 5 as shown in FIG. 4 may be configured to be a single unit and be inserted and connected to the connection line 4 in consideration of convenience of attachment adjustment of the apparatus.

Next, the change of the operating characteristic of a freezing machine was measured by using the electrical waveform adjuster of the present invention.

The adjusting circuit 5 of the electrical waveform adjuster was configured such that seven soft-copper wire rods of 0.8 mm$^2$ were twisted together to be a line of 3.5 mm$^2$ as the connection line 21, and three column-shaped bodies 22 having the external diameter of 11φ and the height of 11 mm were formed with silver (product name: silver ball, degree of purity is 99.99%) and were fixed to the connection line 21 by a solder at intervals of 11 mm. Ceramic particles were used as the filling material. The core component was accommodated in a cylindrical ceramic outer frame having the internal diameter of 30φ, the external diameter of 40φ, and the length of 65 mm, and the top and bottom ends of the outer frame were sealed by insulating rubbers (manufactured by YAHATA NEJI, product name: bonnet rubber).

Three of the above adjusting circuits 5 were connected between a 50 μF low-voltage phase advance capacitor (manufactured by Matsushita Electric Industrial Co., Ltd., product name: phase advance capacitor (indoor application) ZA-50L) and a 200V power feeding line.

A refrigerant compressor shown in Table 1 and a cooling fan shown in Table 2 were used as the freezing machine.

Figure 5:
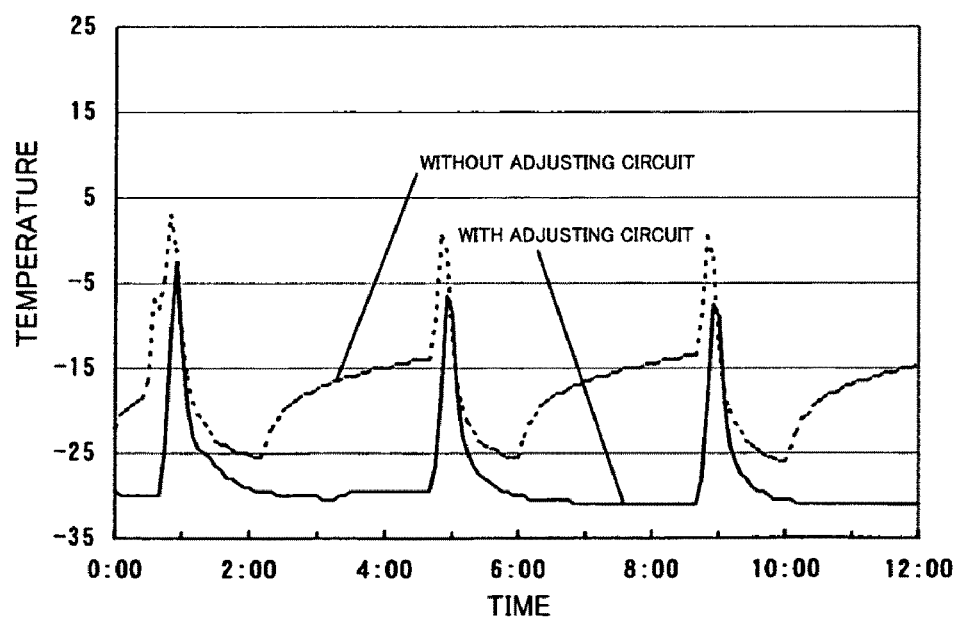
FIG. 5 is a graph showing a temperature change in a freezing compartment before and after attaching the electrical waveform adjuster.

The temperature changes in the freezing compartment before and after attaching the adjusting circuit 5 are shown in FIG. 5.

TABLE 1

| | |
|---|---|
| Product Type | LCU-30P |
| Nominal Output | 2.2 KW |
| Power | 3φ 200 V 50 Hz |
| Type of Used Refrigerant | R22 |
| Compressor | C-L22M3C |
| Crankcase Heater | 60 W |
| Product Mass | 80 kg |
| Starting Current | 57 A/53 A |
| Full-Load Current | 11 A |
| Company Name | SANYO Electric Co., Ltd. |

TABLE 2

| | |
|---|---|
| Product Type | MCF-31NS |
| Power | 3φ 200 V 50 Hz |
| Output of Cooling Fan | 50 W |
| Operation Current | 0.43 A |
| Input | 115 W |
| Starting Current | 0.85 A |
| Full-Load Current | 11 A |
| Company Name | SANYO Electric Co., Ltd. |

As shown by the dotted line in the graph of FIG. 5 (in a case where the adjusting circuit is not used), from the temperature change in the freezing compartment before attaching the adjusting circuit 5, it can be understood that the cooling capacity was lowered due to frost gradually formed on a cooling pipe in the freezing compartment and the cooling capacity was recovered by the operation of a defrost heater in every 4 hours to remove the frost.

Meanwhile, as shown by the solid line in the graph of FIG. 5 (in a case where the adjusting circuit is used), after attaching the adjusting circuit 5, it can be understood that the cooling capacity was improved from about −25° C. to about −30° C., frost condition was improved, and extremely high cooling capacity was maintained.

However, since the operation capability of the compressor was improved shortly after attaching the adjusting circuit 5, the pressure of a normal refrigerant gas became deficient, and it was necessary to input a refrigerant gas for increasing the gas pressure by about 4 kg/cm$^2$.

In addition, the change of the operating characteristic of a hydraulic pump for driving a hydraulic jack was measured by using the electrical waveform adjuster of the present invention.

The adjusting circuit 5 used for the electrical waveform adjuster has the same configuration as the adjusting circuit used in the test of the freezing machine as described above.

Two of the above adjusting circuits 5 were connected between a 10 μF low-voltage phase advance capacitor (manufactured by MARCON ELECTRONICS CO., LTD., product name: phase advance capacitor, single phase 200V 10 μF N2/SH) and a 100V power feeding line.

A hydraulic pump (manufactured by OSAKA JACK CO., LTD., NSP-0.3M) and a hydraulic jack (manufactured by OSAKA JACK CO., LTD., T10S15) were used. The power feeding line was connected to the hydraulic pump.

The hydraulic jack was disposed between fixed upper and lower bases without pressurizing the upper and lower bases. The hydraulic jack moves upwards by the operation of the hydraulic pump. However, since the jack was sandwiched between the upper and lower bases, the jack itself did not move upwards, but the pressure on the upper and lower bases increased. The hydraulic pump was set to stop when the hydraulic pressure in the jack became 69.3 MPa.

A time period from the initiation to cessation of the hydraulic pump operation was set to one cycle. A test was performed by repeating the cycle for five times, and the average power consumption of the hydraulic pump per second was measured.

Concerning the result, the average of the highest average power consumptions in 5 cycles was calculated. When the electrical waveform adjuster of the present invention was not used, the average was 653.1 W, and in contrast, when the electrical waveform adjuster of the present invention was used, the average was 579.4 W. There was about 11% decrease in the highest average power consumption.

In addition, the average of the total power consumptions in 5 cycles was calculated. When the electrical waveform adjuster of the present invention was not used, the average was 2126.6 Wh, and in contrast, when the electrical waveform adjuster of the present invention was used, the average was 2039.3 Wh. There was about 4% decrease in the total power consumption.

From the above results, it can be understood that the operation capability of the hydraulic pump was improved to contribute to a saving of power consumption, by using the electrical waveform adjuster of the present invention.

Next, an influence of the electrical waveform adjuster of the present invention on the torque of an induction motor was tested.

Figure 10:
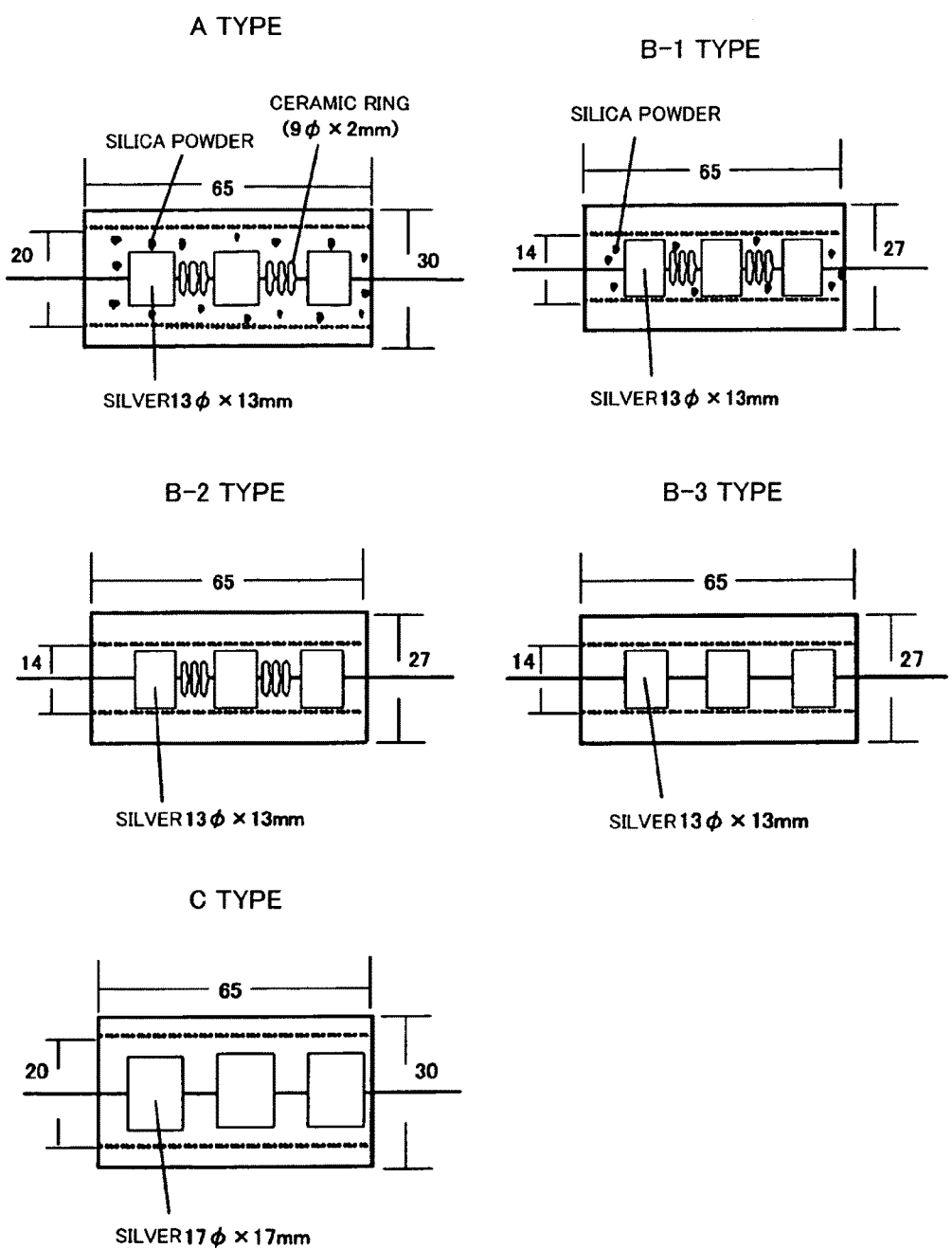
FIG. 10 is a view illustrating different types of electrical waveform adjusters used for an induction motor.

A plurality of different-type adjusting circuits were prepared as shown in FIG. 10. The plurality of different-type adjusting circuits were respectively disposed as the adjusting circuit 5 shown in FIG. 1A, and a three-phase induction motor (200V, 400 W) (manufactured by Mitsubishi Electric Corporation, SE-JR) was connected as the electric apparatus A.

In the A type adjusting circuit, three column-shaped silver bodies with the diameter of 13 mm×the length of 13 mm were prepared and three ceramic rings with the diameter of 9 mm×the length of 2 mm were disposed between the respective column-shaped bodies as shown in FIG. 10. In addition, the above components were accommodated in a ceramic outer frame with the external diameter of 30 mm, the internal diameter of 20 mm and the length of 65 mm, which was filled with a silica powder.

In the B-1 type adjusting circuit, the column-shaped bodies and ceramic rings were disposed as in the A-type adjusting circuit. The above components were accommodated in a ceramic outer frame with the external diameter of 27 mm, the internal diameter of 14 mm and the length of 65 mm, which was filled with a silica powder.

The B-2 type adjusting circuit was the same as the B-1 type adjusting circuit except that the silica powder was removed.

The B-3 type adjusting circuit was the same as the B-2 type adjusting circuit except that the ceramic rings were removed.

The C type adjusting circuit was the same as the A type adjusting circuit except that the silica powder and ceramic rings were removed, and the sizes of the respective column-shaped bodies were changed to have the diameter of 17 mm×the length of 17 mm.

By attaching each of the different-type adjusting circuits and supplying the induction motor (rating is 400 W) with power with 50 to 100% load factor of the induction motor, torque generated in the induction motor was measured. The amount of rise (percentage of torque rise) was calculated from the measured torque with the case where the adjusting circuit is not attached being the basis (0%), and the results are shown in FIG. 11.

Figure 11:
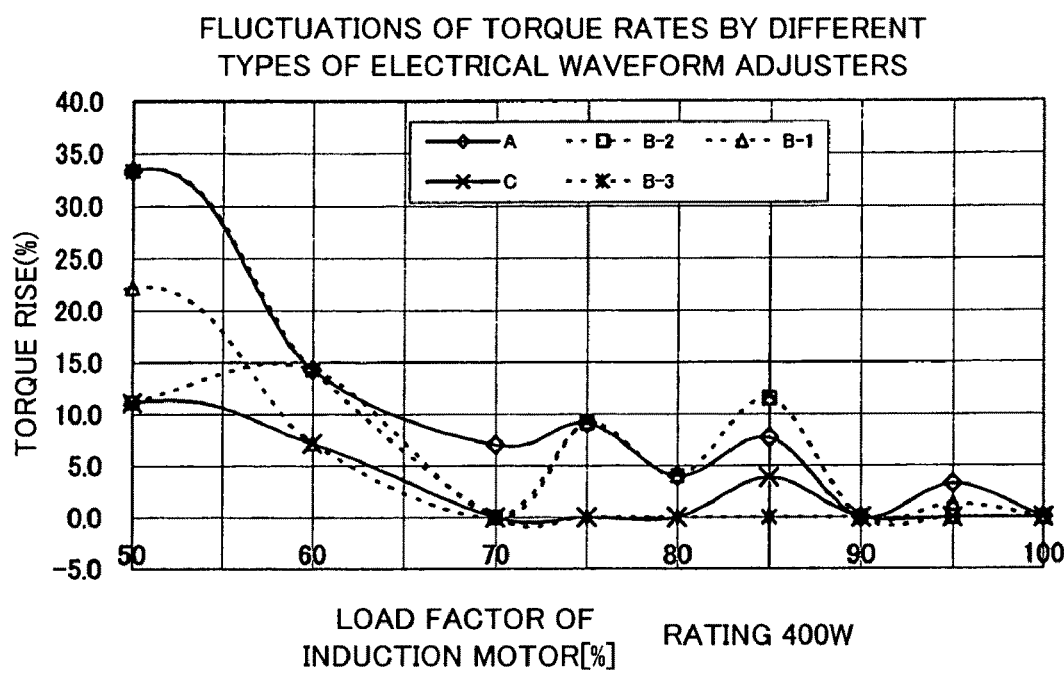
FIG. 11 is a graph showing fluctuations of torque rates by the different types of electrical waveform adjusters.

From the graph in FIG. 11, it can be seen that, in the range from 50 to 70% load factor of the induction motor, there is generated about 11 to 33% torque rise at a maximum in all the adjusting circuits, when compared with the case where the adjusting circuit according to the present invention is not disposed.

In addition, in the adjusting circuit like the A-type in which the column-shaped bodies are accommodated in the ceramic outer frame and the silica powder and ceramic rings are provided, the entire characteristics are improved a lot. In the adjusting circuit as the B-1 type in which the diameter of the outer frame is smaller that that of the A type (the amount of the silica powder accommodated therein decreases correspondingly), the rise rate tends to fluctuate more sharply than the A type. However, in the range of from 80 to 90% load factor of the induction motor, there is higher torque rise rate than the A type. Since the load factor for operating a compressing pump of the freezing machine is generally 75 to 85%, the freezing machine can be expected to improve in performance by using any one of the A type, B-1 type, B-2 type and C type adjusting circuits.

Figure 12:
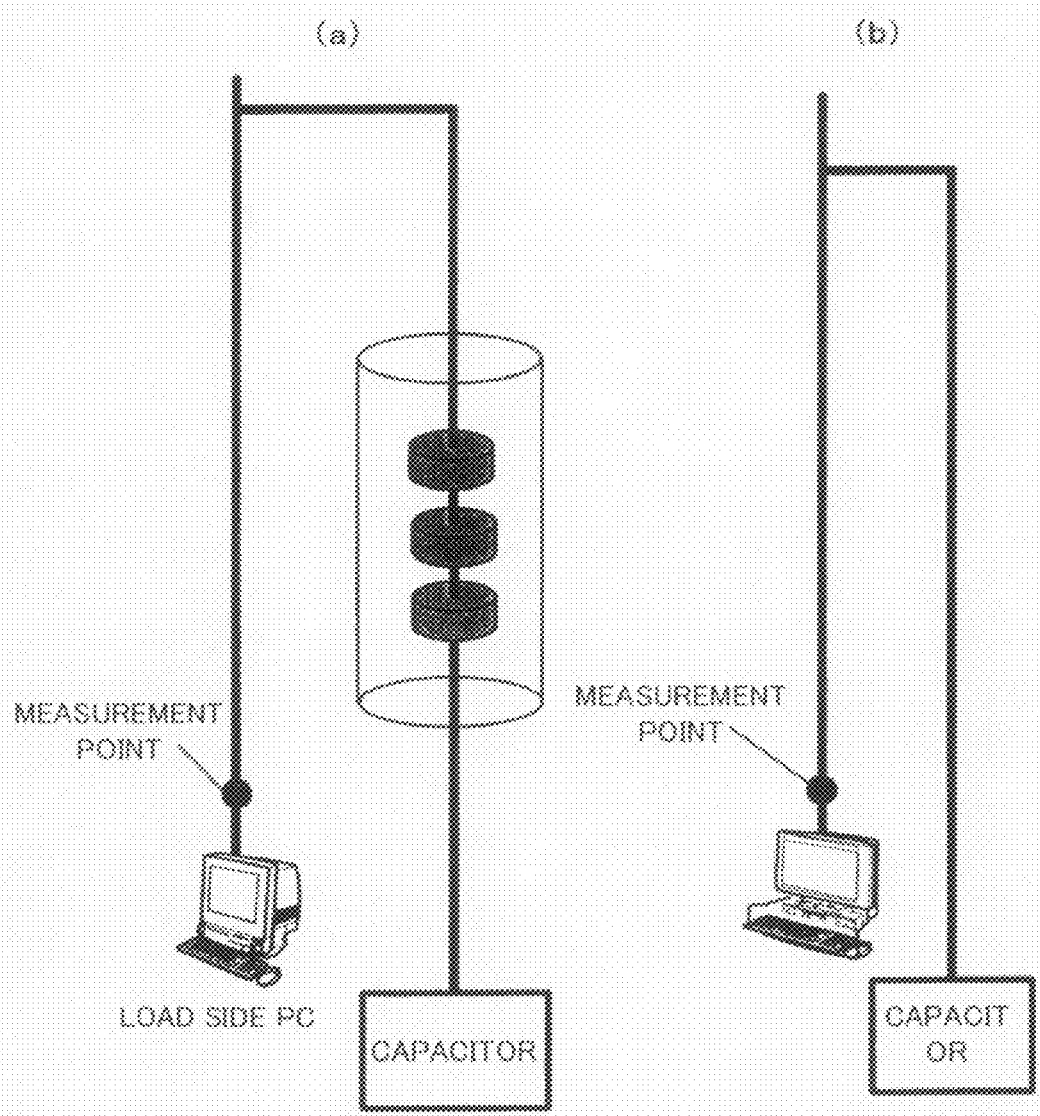
FIG. 12 is a view illustrating a connection state of a personal computer and the electrical waveform adjuster.

Next, the adjusting circuit shown in FIG. 7 was disposed in an electric circuit shown in FIG. 12 to adjust an electrical waveform supplied to a personal computer, and physical harmful effects on users of the personal computer in this case were examined. The examination included 50 men and women aged from twenties to sixties, and conducted a questionnaire before attaching the adjusting circuit and two weeks after attaching the adjusting circuit as to the degree of the physical harmful effects.

As the result, the physical harmful effects were improved a lot since such results were obtained that, among people who had physical disorders such as "tired eyes" (41 people) and "dried eyes" (25 people) before attaching the adjusting circuit, 22 people experienced an improvement in "tired eyes" (improvement rate of 54%) and 12 people experienced an improvement in "dried eyes" (improvement rate of 48%) after attaching the adjusting circuit.

In addition, the physical harmful effects were improved a lot since such results were obtained that, among people who had physical disorders such as "stiffness and pain in shoulders" (45 people) and "stiffness and pain in a neck" (35 people) before attaching the adjusting circuit, 22 people experienced an improvement in "stiffness and pain in shoulders" (49%) and 21 people experienced an improvement in "stiffness and pain in a neck" (60%) after attaching the adjusting circuit.

Figure 13:
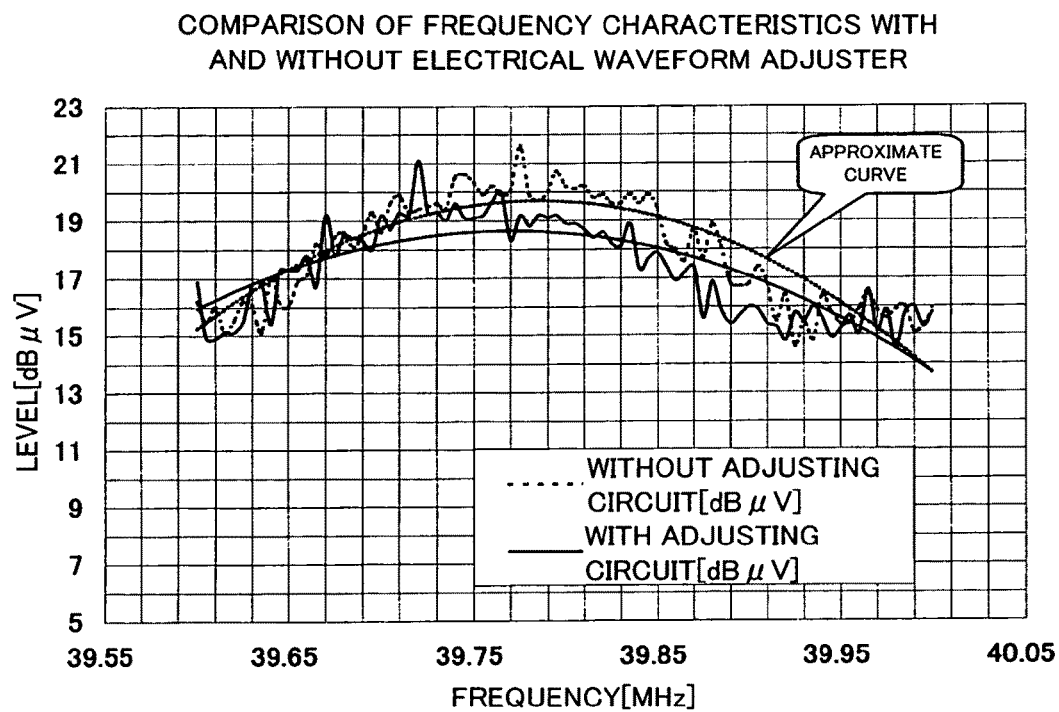
FIG. 13 is a view illustrating fluctuations of frequency characteristics with and without the electrical waveform adjuster.

When the frequency characteristic at a position (measurement point) where electricity is supplied to the personal computer (Body: NetVectra N30, manufactured by Hewlett-Packard Development Company, L. P., Display: FlexScanL350, manufactured by EIZO NANAO Corporation) shown in FIG. 12 was observed, it was found that the frequency characteristic is lowered due to the influences of attaching the adjusting circuit at around 39.8 MHz as shown in FIG. 13 (the dotted line indicates the case without the adjusting circuit, the solid line indicates the case with the adjusting circuit, and the approximate curves of the respective lines are also shown). As to how the frequency at around 39.8 MHz influences the physical harmful effects, the causal relationship hasn't been revealed. However, it can be understood that the electrical waveform adjuster of the present invention influences the improvements in the physical harmful effects in consideration of the questionnaire results as described above and the frequency characteristic in FIG. 13.

Figure 14:
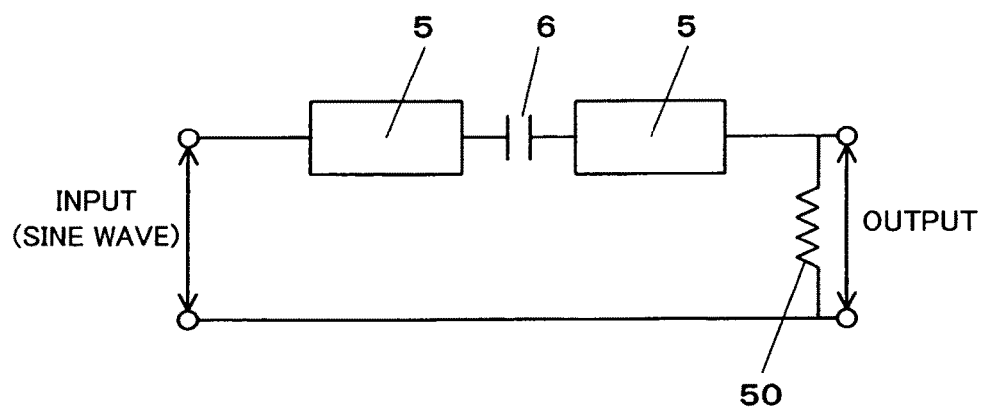
FIG. 14 is a view illustrating a case where the frequency characteristic of the electrical waveform adjuster is measured.

In order to examine harmonic suppression effects by the adjusting circuit 5 of the electrical waveform adjuster according to the present invention, input and output characteristics were measured by configuring a measuring circuit as shown in FIG. 14, incorporating the adjusting circuit shown in FIG. 7 therein as the adjusting circuit 5, and changing an input sine wave in the range from 50 Hz to 20 MHz. Reference numeral 6 denotes a capacitor and 50 denotes resistance for load.

As shown in FIG. 15, it can be understood that a more appropriate sine wave is formed in the output waveform (b) than in the input waveform (a) in the resonance frequency of 15.58 MHz in the electric circuit of FIG. 14. In addition, when the Fourier analysis waveform of the frequency in this case was measured, in the input component (c), there is a peak component (resonance frequency) in the left end portion and first to seventh high harmonics are observed as it goes to the high frequency side of the right direction, and in the output component (d), it can be observed that harmonic components are suppressed very effectively.

As described above, in the electrical waveform adjuster of the present invention, it is possible to suppress the harmonic components and adjust the electrical waveform to an appropriate waveform.

The present invention is not limited to the configuration as described above, but for example, a power factor adjusting means such as a coil which delays a power factor may be used instead of the phase advance capacitor, as the power factor adjusting means used in the electrical waveform adjuster of the present invention, to prevent the power factor from advancing too much due to the use of an electric apparatus. As described above, it is needless to say that a well-known technique in the art may be applied to the electrical waveform adjuster of the present invention.

As described above, in the present invention, it is possible to provide the electrical waveform adjuster capable of adjusting various voltage waveforms supplied to an electric apparatus to improve the operation capability of the electric apparatus, and also, to provide the electrical waveform adjuster capable of mitigating physical harmful effects on a user of the electric apparatus.

What is claimed is:

1. An electrical waveform adjuster provided in a connection line between a power feeding line for feeding an alternating-current voltage to an electric apparatus and a power factor adjusting capacitor connected in parallel with the power feeding line, wherein the waveform adjuster comprises:
   at least one mass comprised of a conductive material attached to the connection line;
   a ceramic outer frame formed to enclose the mass; and
   a non-conductive filling material provided between the outer frame and the mass,
   and wherein the filling material is comprised of a material comprising at least one of ceramic particles and silica rock.

2. The electrical waveform adjuster according to claim 1, wherein the mass is column-shaped, and the connection line penetrates along a central axis of the column-shaped mass.

3. The electrical waveform adjuster according to claim 1, wherein a metal comprising at least one of gold, silver, and copper is the conductive material.

4. The electrical waveform adjuster according to claim 1, wherein the mass is one of at least two masses which are disposed along the connection line, and a ceramic ring-shaped member is disposed between the masses.

5. An electrical waveform adjuster provided in a connection line connected in parallel or in series with a power feeding line for feeding an alternating-current voltage to an electric apparatus, wherein the waveform adjuster comprises:
   at least one mass comprised of a conductive material attached to the connection line;
   a ceramic outer frame formed to enclose the mass; and
   a non-conductive filling material provided between the outer frame and the mass,
   and wherein the filling is comprised of a material comprising at least one of ceramic particles and silica rock.

6. The electrical waveform adjuster according to claim 5, wherein the mass is column-shaped, and the connection line penetrates along a central axis of the column-shaped mass.

7. The electrical waveform adjuster according to claim 5, wherein a metal comprising at least one of gold, silver, and copper is the conductive material.

8. The electrical waveform adjuster according to claim 5, wherein the mass is one of at least two masses which are disposed along the connection line, and a ceramic ring-shaped member is disposed between the masses.

9. An electrical waveform adjuster provided in a connection line between a power feeding line for feeding an alternating-current voltage to an electric apparatus and a power factor adjusting capacitor connected in parallel with the power feeding line, wherein the waveform adjuster comprises:
   at least one mass comprised of a conductive material attached to the connection line;
   a ceramic outer frame formed to enclose the mass; and
   a non-conductive filling material provided between the outer frame and the mass;
   and wherein the mass is one of at least two masses which are disposed along the connection line, and a ceramic ring-shaped member is disposed between the masses.

10. The electrical waveform adjuster according to claim 9, wherein the mass is column-shaped, and the connection line penetrates along a central axis of the column-shaped mass.

11. The electrical waveform adjuster according to claim 9, wherein a metal comprising at least one of gold, silver, and copper is the conductive material.

12. An electrical waveform adjuster provided in a connection line connected in parallel or in series with a power feeding line for feeding an alternating-current voltage to an electric apparatus, wherein the waveform adjuster comprises:
   at least one mass comprised of a conductive material attached to the connection line;
   a ceramic outer frame formed to enclose the mass; and
   a non-conductive filling material provided between the outer frame and the mass,
   and wherein the mass is one of at least two masses which are disposed along the connection line, and a ceramic ring-shaped member is disposed between the masses.

13. The electrical waveform adjuster according to claim 12, wherein the mass is column-shaped, and the connection line penetrates along a central axis of the column-shaped mass.

14. The electrical waveform adjuster according to claim 12, wherein a metal comprising at least one of gold, silver, and copper is the conductive material.

* * * * *